Aug. 2, 1955 A. FENER 2,714,416
HEAT SEALING MACHINE AND SEALING MEMBER THEREFOR
Filed June 28, 1954
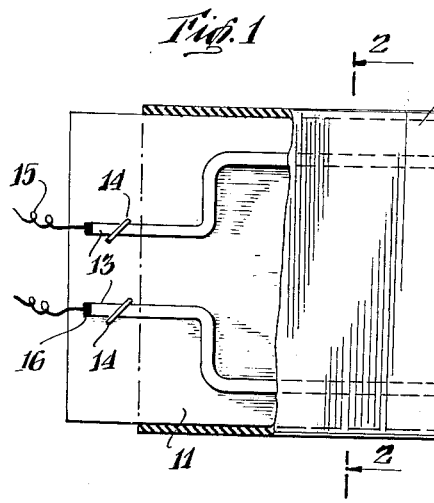
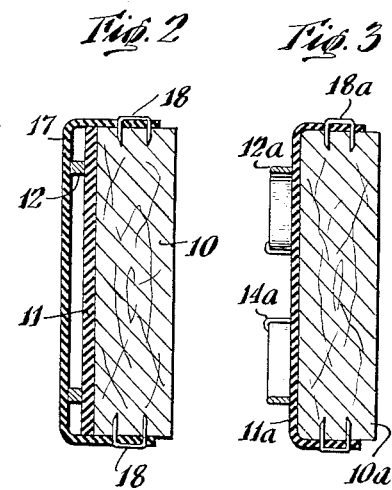
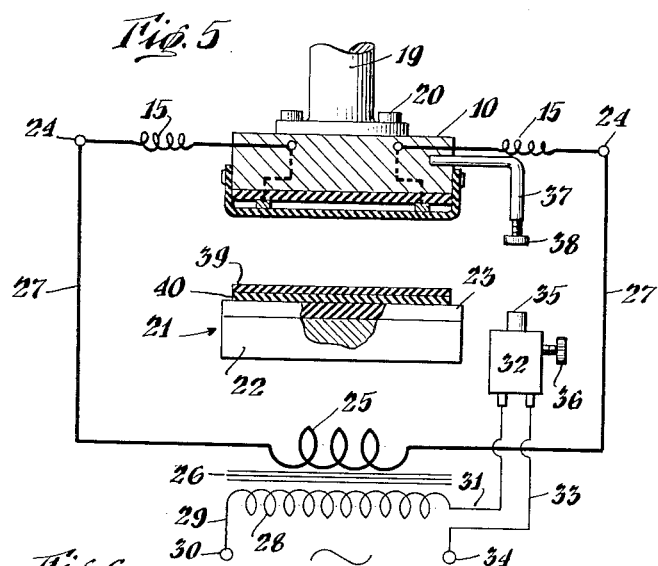
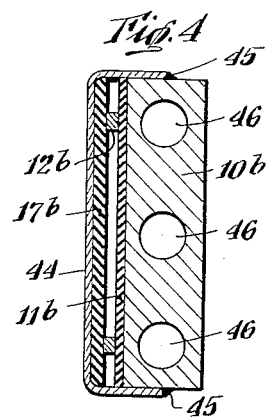
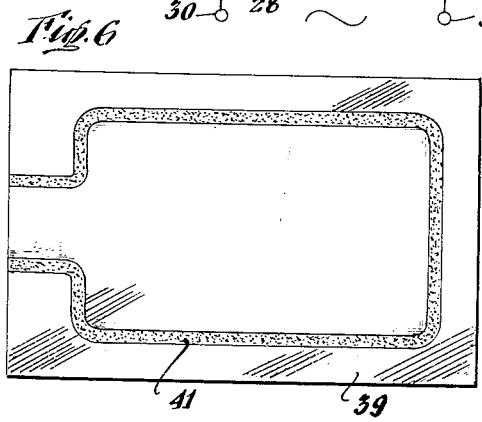
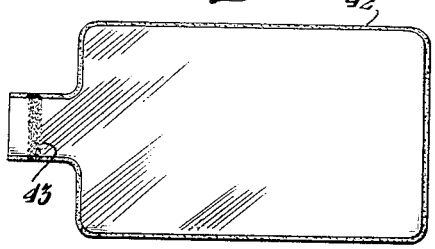
INVENTOR
Alfred Fener
BY
ATTORNEY

2,714,416

HEAT SEALING MACHINE AND SEALING MEMBER THEREFOR

Alfred Fener, Brooklyn, N. Y., assignor to Nicholas Langer, New York, N. Y.

Application June 28, 1954, Serial No. 439,825

10 Claims. (Cl. 154—42)

The present invention relates to the art of heat sealing thermoplastic sheets or films and, more particularly, to a heat sealing machine and sealing member of novel and improved character.

In Langer Patent 2,460,460, there is disclosed a heat sealing machine wherein the sealing heat is generated in a heater element in the form of a thin strip or band of metal having high specific resistivity by passing a short pulse of electric current therethrough. This metal strip or band is tensioned between two terminals over a suitable base, of which at least the top surface is formed of a heat-resistant insulating material. As the heater element expands to a substantial extent during the passage of heater current therethrough, it is desirable to provide means for placing the said element under tension, thereby to avoid buckling and deformation thereof. A heater element of this type heats up to sealing temperature practically instantaneously upon the passage of a pulse of current therethrough, thus causing heat sealing or welding of the thermoplastic layers against which it is applied. Preferably, pressure is maintained upon the layers for a short period after the end of the sealing pulse of current to permit the seal to cool and to consolidate under pressure, whereby a very satisfactory seal is obtained.

Although heat sealing machines of the described character, generally called thermal impulse sealers, were quite successful on a practical and industrial scale, their usefulness was to some extent limited to the production of straight line or rectilinear seals. This was due to the fact that the heater element in the form of a thin metal ribbon or band had to be maintained in a continuously tensioned or stretched condition, otherwise it would become quickly deformed or even broken as a result of its successive expansions and contractions while under pressure during each sealing cycle. On the other hand, there are many practical applications where a seal of curved configuration is desired, such as seals substantially enclosing or encircling a given area. Seals of this type were heretofore difficult to obtain with thermal impulse sealers unless the dimensions of the seal were sufficiently small so that expansion and contraction of the heater element were not significant factors.

I have discovered a simple and completely satisfactory solution of the outstanding problem.

It is an object of the present invention to improve heat sealing machines of the thermal impulse type.

It is another object of the present invention to provide a novel and improved heat sealing machine of the thermal impulse type which is capable of producing seals of any desired configuration, including seals of curved shape or seals substantially enclosing a predetermined area.

It is a further object of the invention to provide an improved sealing member for thermal impulse sealers which is quickly and readily adaptable to the production of seals of any desired configuration by the introduction of preformed heater elements of such configuration.

The invention also contemplates a thermal impulse sealer for producing seals of any desired configuration which is simple in construction, reliable in operation regardless of the shape of the seal formed, and which may be readily manufactured and sold on a practical and industrial scale at a low cost.

Other and further objects and advantages of the present invention will become apparent from the following description, taken in conjunction with the accompanying drawing, in which:

Fig. 1 is a top elevational view of a sealing member embodying the invention, with portions of the top layer broken away for clarity of illustration;

Fig. 2 is a vertical sectional view taken on line 2—2 of Fig. 1;

Fig. 3 is a view similar to Fig. 2 illustrating a modified embodiment of the invention;

Fig. 4 is a similar view showing a further modified embodiment of the invention;

Fig. 5 is a side elevational view, somewhat diagrammatic in character and having parts in section, of an impulse sealer having the sealing member of Figs. 1 and 2 incorporated therein;

Fig. 6 is a top elevational view of a pair of thermoplastic layers heat sealed together by means of the sealing member shown in Figs. 1 and 2; and Fig. 7 is a similar view of a pair of thermoplastic layers heat sealed together by means of the sealing member shown in Fig. 3.

Broadly stated, in accordance with the principles of my invention, I provide a heater element in the form of a metal ribbon, band or wire bent into the shape of the desired seal. The ends of this preshaped heater element are secured to a base or sealing plate, of which at least the exposed surface is formed of heat-resistant insulating material in such a manner that substantially no tensional forces are applied to the element. Preferably, a thin layer of heat-resistant insulating material is tensioned over the heater element maintaining the element in contact with the base throughout its length. Thus, the intermediate portions of the heater element are unrestrained against expansion and contraction in any direction in a plane parallel to the surface of said base, but are held against displacement away from the base. This freedom for moderate displacement is an important feature of the present invention as it permits free expansion and contraction of the heater element during successive sealing cycles without the danger of any buckling, wrinkling or other unpredictable deformation which would cause rapid destruction of the heater element.

In some cases it is desirable ot provide a thin metal layer over the surface of the heat-resistant insulating layer in order to obtain a completely smooth sealing face. It is also possible to dispense with both the insulating and metal layers when the heater element is of sufficient mechanical strength so that its intermediate portions are retained in contact with the base due to the inherent rigidity of the element. Such structure offers special advantages for certain practical applications.

The sealing member of the invention is mounted for cooperation with a plane pressure member, the top or exposed surface of which is preferably covered with a layer of a heat-resistant elastomer, such as, for example, a suitable silicone rubber.

Referring now more particularly to Figs. 1 and 2 of the drawing, reference numeral 10 denotes a base formed of any material having sufficient mechanical strength, such as metal, a suitable plastic, fibre or wood. In most cases the use of wood is quite advantageous since it permits the attachment of heater elements of any desired configuration or their rapid replacement with elements of a different shape, particularly as the electrical insulating properties of the base are not too critical in view of the relatively low voltages used for energizing the heater element. The operative face of the base is covered with a layer 11 of heat-resistant insulating material, a Fiberglas fabric coated with Teflon (tetrafluoro-ethylene) being very satisfactory for the purpose. The object of this insulating layer is to electrically insulate the heater element from the base and to protect the base against the detrimental effect of sealing heat.

Upon the insulating layer rests heater element 12 in the form of a thin and narrow ribbon of a metal or alloy of high specific resistivity, such as a suitable nickel-chromium alloy sold under the name Nichrome. The ends 13 of this metal ribbon are secured to the base in any suitable manner, such as by means of metal staples 14 straddling the said ends and driven into the wooden base through the underlying insulating layer 11. Electrical connection is made to the ends of the heater element by means of flexible lead wires 15, welded, soldered or brazed to the said ends as indicated at 16.

A second thin layer 17 of flexible, heat-resistant insulation is tensioned over the exposed surface of heater element 12, this being accomplished, for example, by bending the marginal regions of layer 17 over the lateral edges of base 10 so that such regions will lie flat against the sides of the base and are held in such position by means of staples 18 driven into the base. This layer may be formed of the same material as layer 11, such as Fiberglas impregnated with Teflon.

The provision of insulating layer 17 serves a plurality of purposes. First of all, it will securely hold the intermediate portions of the heater element against the base, this being necessary since in most cases the heater element is of a relatively thin gauge and is quite flexible. Together with insulating layer 11, it defines an interspace in which the heater element, of which only the ends are positively fixed on the base, is free to expand and to contract under the effect of sealing pulses of current passed therethrough. In addition, the insulating layer 17 also constitutes the operative or sealing face of the sealing member of the invention and may have such characteristics as to prevent its sticking to the sealed thermoplastic layers. It will be further noted that this form of mounting does not place any tensional stresses upon the heater element thereby preventing buckling, wrinkling or similar deformation of the heater element which otherwise would result from repeated expansion and contraction thereof during successive sealing cycles.

Fig. 5 illustrates the incorporation of the sealing member shown in Figs. 1 and 2 into a complete heat sealing machine, similar reference numerals being used to denote identical parts.

Base 10 of the sealing member is arranged for reciprocation by any suitable mechanism, for example, an air cylinder (not shown), such mechanism being diagrammatically indicated by means of a support 19, attached to the base by means of screws 20. The sealing member cooperates with an underlying pressure member, generally denoted by numeral 21, and comprising a rigid base 22 of metal or wood and a top layer 23 of a heat-resistant elastomer, such as a suitable grade of silicone rubber.

Flexible lead wires 15 of heater element 12 are connected to terminals 24 and are of such length as to permit reciprocatory displacement of the sealing member. Their terminals 24 are connected to the respective ends of secondary winding 25 to a step-down transformer 26 by lead wires 27. Primary winding 28 of the said transformer has one of its ends connected through lead wire 29 to one of the terminals of the alternating current power line 30, while the other end of said winding is connected through lead wire 31, a time delay switch 32 and another lead wire 33 to the other terminal 34 of the power line. Time delay switch 32 is provided with an operating plunger 35 and an adjustment screw 36, whereby the length of the time delay period may be regulated. The time delay switch may be of the pneumatic, magnetic or electronic type and its structure need not be described, particularly as switches of this type and suitable for the purposes of the invention are disclosed in Langer Patents 2,460,460 and 2,479,375. It will be sufficient to state that upon depression of operating plunger 35, the switch closes the circuit with which it is electrically associated and then automatically opens the circuit a predetermined period thereafter, depending upon adjustment of screw 36. An L-shaped actuating rod 37 has the end of its horizontal portion fixed in base 10 of the sealing member and its vertically depending end carries a screw 38 which will strike against operating plunger 35 of the time delay switch sometime during the downward displacement of the sealing member. The exact moment when this will occur can be adjusted by turning screw 38 and thereby adjusting the effective length of the actuating rod.

From the foregoing description the operation of my novel heat sealing machine and sealing member will be readily understood by those skilled in the art. When it is desired to operate the machine, a pair of thermoplastic layers 39 and 40 are placed upon the top surface of pressure member 21 and then the reciprocating means (not shown) of the sealing member are actuated. During downward displacement of the sealing member, screw 38 at the end of actuating rod 37 will strike against operating plunger 35 of the time delay switch and will thus initiate operation of the said switch. Preferably this should take place at the time when the sealing member and pressure member are already in their pressure-applying position, or shortly before that time.

Actuation of time delay switch 32 will close the circuit of primary winding 28 of the step-down transformer 26 and, as a result, an alternating current of lower voltage will be induced in secondary winding 25. A heavy current impulse will be caused to flow through heater element 12 and will heat it practically instantaneously to heat sealing temperature. This heat, effective through the thickness of heat-resistant layer 12, will cause heat sealing of the underlying thermoplastic layers 39, 40 in a corresponding region.

A short period thereafter, time delay switch 32 will automatically open the circuit of the transformer primary 28, thereby de-energizing the heater element. Preferably, pressure is maintained upon the sealed thermoplastic layers for a short period thereafter in order to permit the sealed region to cool and to consolidate under pressure. Finally, the pressure is released and the sealed layers are removed, preparing the machine for the next sealing cycle.

The shape of the seal will faithfully follow the shape of the heater element 12, as this will be readily observed in Fig. 6, in which the sealed region is denoted by reference numeral 41. When it is desired to produce a seal of a different shape, all that is necessary is to temporarily remove outer heat-resistant layer 17 and to replace the old heater element 12 with another one having the desired configuration, finally replacing layer 17. All this can be accomplished in a few minutes, the rapidity of change-over being greatly facilitated by the provision of a wooden base 10 for the sealing member since in that case conventional steel staples may be used for securing the several structural parts to the base.

Experience has indicated that the sealing members of the invention are capable of producing many thousands of curved seals without appreciable deterioration. This is due to the fact that the heater element, although in most cases relatively thin and quite flexible, is mounted on the base in the complete absence of any tensional forces and thus is capable of free expansion and contraction in the plane of the base under the effect of sealing heat. At the same time, the outer heat-resistant layer 17 prevents any displacement of the heater element away from the base, thus counteracting any tendency to buckling or wrinkling of the heater element, which would cause rapid destruction of the element.

The modification of the sealing member of the invention shown in Fig. 3 is closely similar to the one just described, except for the fact that the heater element is formed of a band or strip of Nichrome or other alloy of high specific resistivity having sufficient mechanical strength or rigidity as to be self-sustaining. Reference numeral 10a denotes the base, preferably of wood, having a layer of heat-resistant insulating material 11a stretched over its operating face by means of staples 18a. Upon layer 11a rests heater element 12a in the form of a heavy-gauge Nichrome ribbon standing on one of its edges. This modified heater element has its ends secured to the base in the same way as shown in Figs. 1 and 2, more particularly in the complete absence of tensional forces thereon and having the intermediate portions of the element free for displacement in any direction on the base under the effect of heat expansion and contraction, while the inherent rigidity of the heater element will retain the same against the base at all times.

The operation of this modified embodiment of the invention is substantially identical with that of Figs. 1 and 2. It is to be noted, however, that the exposed edge of the heater element, in addition to heat sealing of the thermoplastic layers, will also function as a cutting edge, severing the portions of the said layers beyond the sealed region. The resulting sealed structure is shown in Fig. 7, in which reference numeral 42 denotes the sealed region outside of which the layers have been cut off. This structure constitutes a container which may be filled with the materials to be packaged and may then be sealed by a transverse seal 43 in a separate operation, if desired.

The further modification of the invention shown in Fig. 4 comprises a base 10b of metal of high heat conductivity, such as brass, having a layer of heat-resistant insulating material 11b thereon. Upon this layer rests heater element 12b in the form of a Nichrome band having the same shape and mounted in the same way at its ends as heater element 12 of Fig. 1. However, as the base 10b is of metal, instead of staples, screws or bolts (not shown) are used, which are insulated from the base by means of insulating bushings.

Heater element 12b is covered by a second layer of heat-resistant insulation 17b, upon which is superposed a thin metal sheet 44 of Nichrome or some other metal or alloy having relatively low heat conductivity. The marginal portions of metal sheet 44 are folded over the sides of the base 10b and are secured thereto, for example, by hard soldering, such soldered joints being indicated at 45.

In the operation of the sealing member of Fig. 4, the sealing heat generated in heater element 12b will pass through the thickness of heat-resistant layer 17b and will heat the metal layer 44 in a corresponding region. As the sealing cycle is relatively short and as the heat conductivity of metal layer 44 is relatively low, the heat will not appreciably spread in the said layer, but will approximately reproduce the configuration and width of the heater element. The advantage of this form of construction is that in the form of metal layer 44, a completely smooth sealing face is provided in which heated sealing regions co-exist side by side with relatively cool pressure regions. This is highly desirable when sealing certain thermoplastic materials, such as, for example, polyvinylidene chloride. Furthermore, the residual heat remaining after each sealing operation is quickly carried away into the base, partly through the heat-resistant layer 11b underlying the heater element, partly in the plane of metal layer 44, the ends of which are in direct contact with the metal base 10b. If desired, water or some other coolant fluid may be passed through channels 46 provided in base 10b, thereby further promoting cooling of the heater element of the invention.

The thickness of the heater element of the invention may be subject to considerable variation, in accordance with the specific sealing problem contemplated. Thus, where a relatively flexible heater element is used, such as in the form of the invention shown in Fig. 1, a Nichrome ribbon having a width between .050" and .250", and having a thickness between .001" and .025" is satisfactory. Where a self-sustaining heater element is used, as in Fig. 3, its thickness may be between .010" and .050". The heat-resistant layer, such as Teflon-coated Fiberglas fabric, may have a thickness between .003" and .020", in general a thicker layer being used underneath the heater element than above the said element.

Although the present invention has been disclosed in connection with a few preferred embodiments thereof, variations and modifications may be resorted to by those skilled in the art without departing from the principles of the present invention. I consider all of these variations and modifications to be within the true spirit and scope of the present invention, as disclosed in the foregoing description and defined by the appended claims.

I claim:

1. A sealing member for heat sealing machines comprising, in combination, a base having a plane face, and an elongated metal heater element of curved configuration having its ends secured to said base in the absence of any tensional forces on said element and having its operative face in parallelism with said face of the base, the portions of said element between its ends being free for displacement in the plane of said base but being restrained against displacement away from said base.

2. A sealing member for heat sealing machines comprising, in combination, a base having a plane insulating face, and an elongated metal heater element of curved configuration adapted to be directly heated by the passage of an electric current therethrough on said face of the base and having its terminal portions secured thereto in the absence of any tensional forces on said element said element having its operative face in parallelism with said face of the base, the intermediate portions of said heater element being unrestrained against expansion and contraction in any direction in a plane parallel with the surface of said base but being held against displacement in any direction at an angle with respect to said plane.

3. A sealing member for heat sealing machines comprising, in combination, a base having a plane operating face formed of heat-resistant insulating material, and an elongated metallic heater ribbon of curved configuration on said face of the base and having its ends secured thereto in the absence of tensional forces on said ribbon, said ribbon having its operative face in parallelism with said face of the base and having sufficient rigidity to maintain its intermediate portions against said face of the base while being unrestrained against displacement in the plane of said face when said ribbon expands and contracts under the effect of sealing pulses of an electric current passed therethrough.

4. A sealing member for heat sealing machines of the thermal impulse type comprising, in combination, a base having a plane operating face formed of heat-resistant insulating material, and a heater ribbon of generally curved configuration on said face of the base with its plane arranged perpendicularly thereto and having its ends secured to the base in the absence of tensional forces on said ribbon, said ribbon having its operative face in parallelism with said face of the base and having sufficient inherent rigidity to maintain the edge of its intermediate portions against said face of the base while being unrestrained against displacement in the plane of said face when said ribbon expands and contracts in response to sealing pulses of an electric current passed therethrough.

5. A sealing member for heat sealing machines of the thermal impulse type comprising, in combination, an insulative base having a plane face, an elongated heater element of generally curved configuration having its ends secured to said base in the absence of tensional forces on said element and having its operative face in parallelism with said face of the base, and a thin layer of heat-resistant insulating material extending over the operative face of said heater element, said layer of insulating material holding said heater element against the face of said base while permitting free expansion and contraction thereof in any direction parallel to the plane of said face.

6. A sealing member for heat sealing machines of the thermal impulse type comprising, in combination, a base having a plane insulating face, a metallic heater ribbon of generally curved configuration having its ends secured to said base in the absence of tensional forces on said ribbon and having its operative face in parallelism with said face of the base, and a thin layer of flexible heat-resistant insulating material tensioned over the operative face of said ribbon and having its terminal regions secured to said base, said layer of insulating material together with the face of said base defining an interspace in which the heater ribbon is free to expand and to contract in response to pulses of current passing therethrough while being restrained against displacement away from the face of said base.

7. A sealing member for heat sealing machines of the thermal impulse type comprising, in combination, a base having a plane operating face formed of heat-resistant insulating material, a metallic heater ribbon of generally curved configuration on said base with its operative face parallel to said face of the base and having its ends fixed in the absence of tensional forces thereon, and a thin layer of flexible heat-resistant insulating material tensioned over the exposed face of said ribbon and having its terminal regions secured to said base, said layer of insulating material together with the face of said base defining an interspace in which the heater ribbon is free to expand and to contract in response to pulses of current passing therethrough while being restrained against displacement away from the face of said base.

8. A sealing member for heat sealing machines of the thermal impulse type comprising, in combination, a base having a plane operating face formed of heat-resistant insulating material, a metallic heater ribbon of generally curved configuration on said base and having its ends fixed in the absence of tensional forces on the ribbon, a thin layer of heat-resistant insulating material over the exposed face of said ribbon, and a thin metal layer over said layer of insulating material constituting the operative face of the sealing member in which the sealing heat generated in the ribbon and transmitted through the layer of insulating material is effective, said layer of insulating material together with the face of said base defining an interspace in which the heater ribbon is free to expand and to contract in response to pulses of current passing therethrough while being restrained against displacement away from the face of said base.

9. A sealing member for heat sealing machines of the thermal impulse type comprising, in combination, a base of metal of relatively high heat conductivity, a first layer of heat-resistant insulation on said base, a metallic heater ribbon of curved configuration on said base and having its ends fixed in the absence of tensional forces on the ribbon, a second layer of heat-resistant insulation over the exposed face of said ribbon, and a thin metal layer of relatively low heat conductivity tensioned over said second layer of insulation with its terminal regions connected to the base and constituting the operative face of the sealing member in which the sealing heat generated in the ribbon and transmitted through the second layer of insulation is effective, said layers of insulation defining an interspace therebetween in which the heater ribbon is free to expand and to contract in response to pulses of current passing therethrough while being restrained against displacement away from the base.

10. A heat sealing machine comprising a pressure member; a sealing member including a base having a plane face with an elongated heater element of curved configuration having its ends secured thereto in the absence of any tensional forces on said element and having its operative face in parallelism with said face of the base, the portions of said element between its ends being free for displacement in the plane of said base but being restrained against displacement away from said base; means for reciprocating said members; and means for passing a pulse of current through said heater element thereby to cause heat sealing of thermoplastic layers interposed between the members in a region corresponding in shape to that of said heater element.

References Cited in the file of this patent

UNITED STATES PATENTS 2,460,460     Langer                 Feb. 1, 1949